US008700916B2

(12) United States Patent
Bell et al.

(10) Patent No.: US 8,700,916 B2
(45) Date of Patent: Apr. 15, 2014

(54) UTILIZING PHYSICALLY UNCLONABLE FUNCTIONS TO DERIVE DEVICE SPECIFIC KEYING MATERIAL FOR PROTECTION OF INFORMATION

(75) Inventors: Robert T. Bell, Davis, UT (US); Catherine Leslie Kilcrease, San Jose, CA (US); Amar Chand Amar, Fremont, CA (US); Jan L. Dukes-Schlossberg, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 13/310,419

(22) Filed: Dec. 2, 2011

(65) Prior Publication Data
US 2013/0142329 A1 Jun. 6, 2013

(51) Int. Cl.
*H04L 9/28* (2006.01)
*H04L 9/10* (2006.01)

(52) U.S. Cl.
USPC ............................................. 713/189; 380/44

(58) Field of Classification Search
None
See application file for complete search history.

(56) References Cited

U.S. PATENT DOCUMENTS

| 7,681,103 | B2* | 3/2010 | Devadas et al. | 714/752 |
|---|---|---|---|---|
| 7,702,927 | B2* | 4/2010 | Devadas et al. | 713/194 |
| 7,757,083 | B2* | 7/2010 | Devadas et al. | 713/168 |
| 7,818,569 | B2* | 10/2010 | Devadas et al. | 713/168 |
| 7,840,803 | B2* | 11/2010 | Clarke et al. | 713/168 |
| 7,904,731 | B2* | 3/2011 | Devadas et al. | 713/189 |
| 2008/0279373 | A1* | 11/2008 | Erhart et al. | 380/46 |
| 2009/0217045 | A1* | 8/2009 | Skoric et al. | 713/172 |
| 2010/0054466 | A1* | 3/2010 | Kerins et al. | 380/46 |
| 2010/0085075 | A1* | 4/2010 | Luzzi et al. | 326/8 |
| 2010/0199104 | A1* | 8/2010 | Van Rijnswou | 713/189 |
| 2011/0002461 | A1* | 1/2011 | Erhart et al. | 380/44 |
| 2011/0055851 | A1* | 3/2011 | Potkonjak et al. | 719/318 |
| 2011/0066670 | A1* | 3/2011 | Yu | 708/252 |
| 2011/0191837 | A1* | 8/2011 | Guajardo Merchan et al. | 726/6 |
| 2011/0215829 | A1* | 9/2011 | Guajardo Merchan et al. | 326/8 |

OTHER PUBLICATIONS

Skoric et al., "Robust Key Extraction from Physical Uncloneable Functions", Philips Research Laboratories, Eindhoven, The Netherlands, (16 pages).
Tuyls et al., "Read-Proof Hardware from Protective Coatings", Philips Research Laboratories, Eindhoven, The Netherlands (21 pages).
Tuyls et al., "Secret Key Generation from Classical Physics Physical Uncloneable Functions", (20 pages).
Gassend et al., "Controlled Physical Random Functions", Computer Science and Artificial Intelligence Laboratory (CSAIL), Massachusetts Institute of Technology, Computation Structures Group Memo 457, Dec. 2002, (14 pages).
Suh, et al., "Physical Unclonable Functions for Device Authentication and Secret Key Generation", San Diego, CA, Jun. 2007, (6 pages).

* cited by examiner

*Primary Examiner* — Christopher Revak
(74) *Attorney, Agent, or Firm* — Edell, Shapiro & Finnan, LLC

(57) ABSTRACT

A device specific key is generated within an electronic device by providing a challenge to a physically unclonable function (PUF) structure integrated within the electronic device, where the PUF structure outputs a specific response based upon a specific challenge provided to the PUF structure. The PUF response is provided to a cryptographic module integrated within the electronic device, and a device specific key is generated by the cryptographic module utilizing a cryptographic key generation algorithm. The device specific key is generated based upon a combination of input data including the PUF response and data that is specific to the electronic device.

26 Claims, 4 Drawing Sheets

UTILIZING PHYSICALLY UNCLONABLE FUNCTIONS TO DERIVE DEVICE SPECIFIC KEYING MATERIAL FOR PROTECTION OF INFORMATION

TECHNICAL FIELD

The present disclosure relates to the protection of sensitive or critical information stored within a device utilizing physically unclonable functions.

BACKGROUND

With the increasing use of electronic devices utilizing integrated circuits to provide different types of information for a variety of different applications, there has been an increasing need to adequately protect sensitive or critical information that may be stored within an electronic device to limit access to such information to only such other devices that have permission to access such information. Some examples of applications include the authentication of devices, protection of confidential information within a device, and securing a communication between two or more devices.

A physically unclonable function (PUF) is a physical structure typically within an integrated circuit that provides a number of specific outputs or responses in response to specific inputs or challenges to the PUF. Each PUF provides a discrete and unique set of responses to specific challenges, which makes PUFs suitable for use in hiding keying material in semiconductor devices for encrypting confidential information for such devices.

One issue associated with PUFs is that environmental or other conditions (e.g., temperature and/or voltage fluctuations) can change the output/response of the PUF in response to the same input/challenge. Therefore, a custom error correcting code (ECC) table must be established for each PUF to correct the output values based upon such conditions and to ensure that the PUF response value is consistent for a specific challenge. When a PUF is formed as part of an IC for a semiconductor chip to be used in a device, a chip manufacturer can potentially determine the ECC values for a series of challenges during manufacture of the chip. Thus, it is possible for the keying material provided by a PUF for a semiconductor chip of a device to be determined by a third party vendor during the manufacturing process of the device.

Another issue associated with utilizing a PUF to provide keying information is that typically the amount of keying material desirable for encrypting information within a device is larger than the amount of keying material that can be provided by a reasonably sized PUF structure.

DESCRIPTION OF EXAMPLE EMBODIMENTS

Overview

A method, an electronic device and a computer readable storage media facilitate the generation of a device specific key within an electronic device by providing a challenge to a PUF structure integrated within the electronic device, where the PUF structure outputs a specific response based upon the challenge. A PUF response is provided to a key derivation module integrated within the electronic device, and a device specific key is generated by the key derivation module utilizing a cryptographic key generation algorithm. The device specific key is generated based upon a combination of input data including the PUF response and data that is specific to the electronic device.

Example Embodiments

Figure 1:
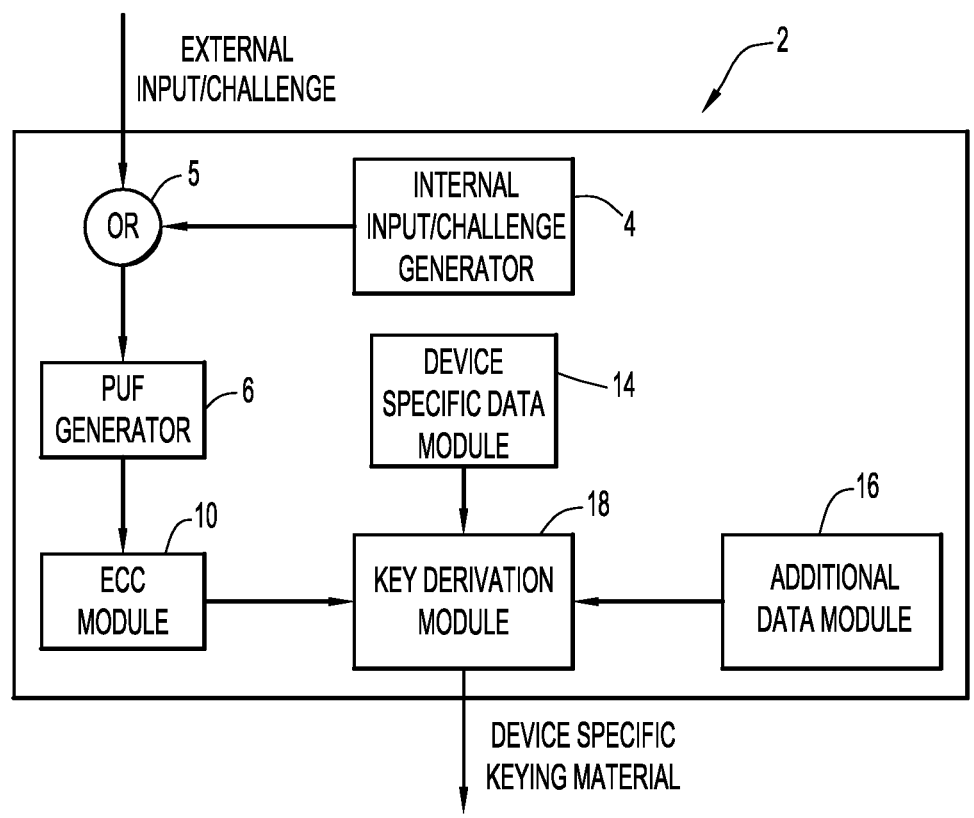
FIG. 1 is a schematic block diagram of components for a cryptographic module of a security semiconductor chip according to an example embodiment, in which the cryptographic module includes a PUF structure that is configured to provide a device specific key based upon the input of an appropriate challenge signal.

Referring to FIG. 1, a block diagram shows components for an example semiconductor security chip. The security chip is configured for implementation within an integrated circuit (IC) board for an electronic device to serve as a device specific sealed key for controlling access to and processing of confidential or security information for the device. In particular, the security chip can be configured to generate a cryptographic key for encryption or decryption of secret information (e.g., information stored within the security chip or, alternatively, information stored within another device). The security chip can be utilized in any type of IC board for any number of applications or types of electronic devices in which sensitive information is stored.

The security chip includes a cryptographic module 2 that is depicted in FIG. 1. The cryptographic module 2 includes a physically unclonable function (PUF) structure, also referred to as a PUF generator 6 in FIG. 1. The PUF generator 6 is configured to receive an input or challenge and output a response that is unique to the particular challenge that is input. The PUF generator 6 can receive an input or challenge signal from an external source (i.e., a signal external to the security chip) or, alternatively, an internal input/challenge signal that is generated internally, e.g., by a generator 4 within the cryptographic module 2 (e.g., where an OR gate 5 directs one of the signals to the PUF generator 6) and/or by any other component. In addition, for certain types of PUFs (such as an SRAM PUF), there is no input challenge required to be input to the PUF. Instead, the challenge for the PUF results from a power cycle (e.g., resetting) associated with the PUF, where a reset of the PUF provides an output based upon the specific configuration of the PUF. Optionally, the input/challenge signal supplied to the PUF generator 6 can be a combination of an external challenge signal and an internal challenge signal provided by the generator 4.

Any suitable PUF structure can be utilized to form the PUF generator 6, where the PUF structure is capable of outputting a plurality of different, unique responses to specific challenges. Some examples of PUFs that are suitable for use in the security chip include, without limitation, silicon based PUF circuits, SRAM (static random access memory) PUF circuits, and Butterfly PUF circuits, all of which are known in the art. Each PUF is unique in that, when a physical stimulus is applied to a PUF structure, it reacts in an unpredictable way due to the exact microstructure and physical factors introduced during manufacture of the PUF. As noted above, certain PUFs receive input data, such as an input or challenge signal, that results in a specific output or response to such input data. In other types of PUFs, such as SRAM PUFs, a power cycle (e.g., a reset) of the PUF results in a specific initial output upon reset that is based upon the configuration of the PUF. Thus, each PUF provides its own unique output or set of unique outputs or responses in response to an input stimuli (e.g., a power cycle or reset of the PUF) or a corresponding set of different input stimuli, also referred to as a challenge or challenges. A specific challenge and its corresponding response form a challenge-response pair for a PUF. Another useful feature of a PUF is that, once integrated within a chip, particularly a chip that has been security sealed, any attempt to probe or scan the chip that might physically alter the PUF will result in a modification and change in output or response values of the PUF.

As previously noted, the responses generated by a PUF can be affected or slightly altered based upon environmental or other conditions (e.g., temperature and/or voltage fluctuations). Therefore, a custom error correcting code (ECC) table must be established for each PUF to correct the PUF response values based upon these conditions and to ensure that the PUF response value is consistent for a specific challenge. The ECC values can be obtained by experimentation after the PUF has been constructed within a chip (e.g., by inputting specific challenge values to the PUF under different conditions and recording the responses for such challenges). Such ECC values can then be stored within an ECC module configured to receive responses from a PUF and alter or correct the response as necessary based upon the ECC values in the ECC table. The cryptographic module 2 comprises an ECC module 10 that includes one or more tables of ECC values corresponding with output responses from the PUF generator 6. The ECC module 10 receives a response from the PUF generator 6 and makes appropriate corrections to each response such that each PUF response is consistent with a specific challenge. The PUF response that is processed by the ECC module 10 is provided to a key derivation module 18 within the cryptographic module 2.

The key derivation module 18 utilizes the corrected PUF response, as provided by the ECC module 10, and combines this data with other data to generate and output a device specific key for use by a cryptographic algorithm of the device (e.g., to encrypt or decrypt information). The key derivation module 18 can utilize any suitable cryptographic key generation algorithm to output a device specific key in response to a correct input or challenge that is presented to the PUF generator 6 in combination with additional data supplied as inputs to the key derivation module 18. An example embodiment of a suitable cryptographic key generation algorithm is a key derivation function (KDF), such as KDFs utilizing one or more hashing functions (e.g., a TLS key derivation function), Advanced Encryption Standards (AES), such as a 192-bit key (AES-192) or a 256-bit key (AES-256) standard, etc. A KDF can also be used to generate multiple types and/or lengths of keying material based upon the PUF response and additional data provided as input.

The cryptographic module 2 further includes a device specific data module 14 that stores information that is unique or specific to the device in which the security chip is integrated and provides such information as additional data for input to the key derivation module 18. Some non-limiting examples of device specific information that can be provided by the device specific data module 14 as input to the key derivation module 18 include at least one serial number associated with the device and/or components of the device (e.g., one or more serial numbers associated with specific components installed on the printed circuit board of the device, such as a manufacturing serial number, a CPU serial number, a product ID number, serial numbers associated with other components of the board, etc.), any other information associated with the device, such as media access control (MAC) address information associated with the device, the hash of the chip private key, etc.

Optionally, other types of information can also be provided as input to deriving a device specific key. An additional data module 16 is shown in FIG. 1 that provides such additional data as input to the key derivation module 18. The additional data can be of any one or more suitable types. For example, the additional data can be randomly generated data that is stored within the additional data module 16, or any specific data that may be associated in some manner with the device supplier that is not readily publicly accessible. Any forms of data can be provided as additional data to be combined with the PUF response and/or device specific information to form the input data for the key derivation module 18.

The key derivation module 18 can combine different data from each of the device specific data module 14 and the additional data module 16 for each PUF response that is provided to the module 18. The key derivation module 18 is configured to output device specific keying material in response to the input of the generated (and corrected) PUF response, device specific data (from module 14) and/or additional data (from module 16).

Figure 2:
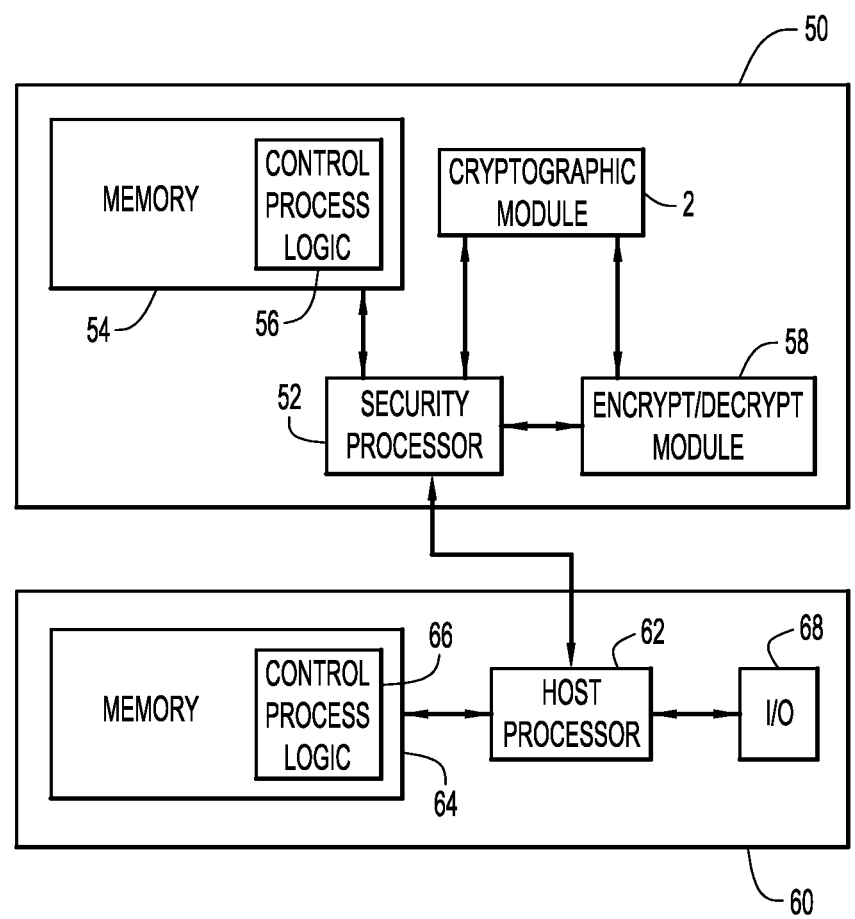
FIG. 2 is a schematic block diagram of a printed circuit board of an example electronic device that includes a security chip containing components of FIG. 1.

An example embodiment of an electronic device that incorporates the security chip including cryptographic module 2 of FIG. 1 is depicted in FIG. 2. The electronic device comprises a printed circuit board (PCB) that includes a plurality of electronic components, including a security chip 50 which includes the cryptographic module 2 of FIG. 1. The printed circuit board further includes a main portion 60 including a host processor and other components. The security chip 50 is security sealed (e.g., utilizing a suitable sealing component, e.g., an epoxy or other polymer material). The security seal prevents undesired access to the PUF generator 6 as well as other components within the security chip 50. In particular, opening of the security seal alters the operability (i.e., the output responses) of the PUF generator 6 thus rendering it useless for providing input information to the key derivation module 18. The security seal further prevents access to the key derivation module 18 as well as the other modules associated with the chip 50. Thus, once sealed, the security chip is designed such that all outputs from the PUF generator 6, all outputs from the key derivation module 18 and all data stored within the ECC module 10 and the data modules 14, 16 are maintained within and inaccessible outside of the security chip.

The main portion 60 of the PCB includes a host processor 62, memory 64 and an input/output (I/O) module 68 that facilitates communications between the device and peripheral devices that couple with the device for input and output of data by the device. The processor 62 comprises a microprocessor or microcontroller that executes control process logic instructions 66 (e.g., operational instructions and/or downloadable or other software applications stored in memory 64).

The memory 64 can include random access memory (RAM) or a combination of RAM and read only memory (ROM), magnetic disk storage media devices, optical storage media devices, flash memory devices, electrical, optical, or other physical/tangible memory storage devices. The host processor 62 executes the control process logic instructions 66 stored in memory 64 for controlling operations of the electronic device. In general, the memory 64 may comprise one or more tangible (e.g., non-transitory) computer readable storage media (e.g., a memory device) encoded with software comprising computer executable instructions and when the software is executed (by the processor 62) it is operable to perform the operations described herein in connection with control process logic instructions 66.

The security chip 50 includes a security processor 52, memory 54, an encryption/decryption module 58, and the cryptographic module 2. The security processor 52 is a co-processor to the host processor 62 and comprises a microprocessor or microcontroller that executes control process logic instructions 56 (e.g., operational instructions stored in memory 54) for controlling operations of the security chip 50, including the operations of generating a PUF output response (e.g., based upon an external input/challenge and/or an input/challenge that is generated internally by the generator 4), combining device specific data and/or additional data with the PUF response and operations of the key derivation module 18 in generating device specific key material for use by the encryption/decryption module 58. For example, the security processor 52 can be configured to control operations of the security chip 50 such that the PUF generator 6 receives input or challenge communicated to the device via the I/O module 68 of the main portion 60 and routing of the device specific keying material generated by the key derivation module 18 to the encryption/decryption module 58. The memory 54 can also include random access memory (RAM) or a combination of RAM and read only memory (ROM), where the memory 54 may comprise one or more computer readable storage media (e.g., a memory device) encoded with software comprising computer executable instructions and when the software is executed (by the security processor 52) it is operable to perform operations in connection with control process logic instructions 56.

Different device specific keys can be generated by the security chip 50 for different applications or purposes. For example, the PUF output response from the PUF generator 6 could be combined with a first type of device specific information provided by the device specific data module 14 and/or a first type of other information provided by the additional data module 16 to generate device specific keying material for a first purpose or application, while another PUF output response from the PUF generator could be combined with a second type of device specific information and/or a second type of other information to generate device specific keying material for a second purpose or application. A determination of which type or types of data from each module 14, 16 are to be combined with a PUF response by the key derivation module 18 can be determined by the security processor 52 and/or the key derivation module 18. For example, an input/challenge may be of a certain type (e.g., identified by length, by order of information, by an identifying header within the input/challenge data, etc.) that identifies the type of component or device submitting the input/challenge, and the type(s) of device specific and/or other data can be selected to be combined with the PUF response for use by the key derivation module 18 based upon such identification. In addition, an external input to the chip 50 may be of a type that triggers generation of an input/challenge by the internal generator 4 for use by the PUF generator 6 to generate the PUF response.

The encryption/decryption module 58 receives the device specific keying material that is output from the cryptographic module 2 and utilizes such device specific keying material to encrypt or decrypt data in response to the device specific keying material being accurate (e.g., based upon an accurate challenge or input being provided to the PUF generator 6). The data can be sensitive information stored within memory 54 that has previously been loaded into the memory 54 during an initialization procedure (e.g., sensitive information provided during initialization of the chip 50 and prior to use with the device), where the data can be encrypted utilizing the encryption/decryption module 58 and stored in an encrypted state within memory 54. Alternatively, the data can be provided by the host processor 62 to the security chip 50 during the use of the device for encryption or decryption (if the data is already encrypted) by the module 58 of the chip 50 based upon the device specific keying material generated by operation of the components of the cryptographic module 2.

Figure 3:
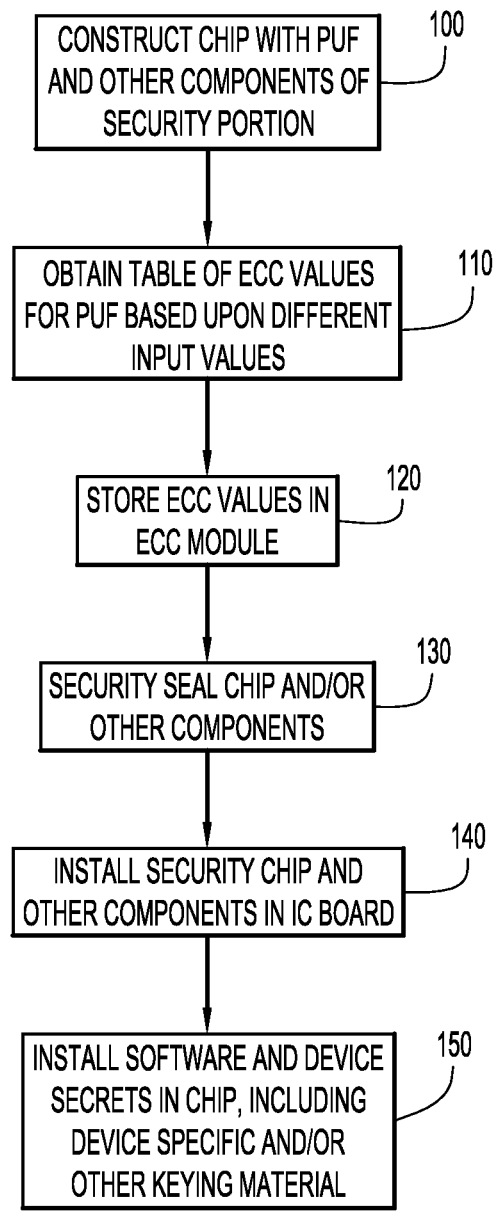
FIG. 3 is a flow chart that depicts an example process for constructing the device of FIG. 1.

Construction and assembly of an electronic device that incorporates a semiconductor security chip including the components as depicted in FIGS. 1 and 2 are now described with reference to FIG. 3. At 100, a chip manufacturer constructs the security chip 50 including components as depicted in FIGS. 1 and 2, which includes the PUF generator 6 (i.e., a suitable PUF structure, such as the example types of previously described PUF structures) that provides a unique set of outputs/responses based upon specific inputs/challenges provided to the PUF generator 6. The other components, including internal input/challenge generator 4, OR gate 5, ECC module 10, data modules 14 and 16, the key derivation module 18, security chip processor 52, memory 54 and encryption/decryption module 58 are also constructed as part of the chip 50.

After these components are manufactured, a table of ECC values for the PUF generator 6 can be determined at 110. The ECC values can be determined, for example, by testing the PUF generator 6 with different input values and under different operating conditions to determine the effect on the PUF output. The table of ECC values can then be stored within the ECC module 10 at 120. The components of the semiconductor chip 50 are then security sealed at 130 so as to prevent any ability for PUF output/response values being accessible outside of the chip 50. As previously noted, the nature of the PUF structure is such that any tampering with the chip 50 by removal of the sealing material around the chip 50 results in altering of the PUF structure which in turn alters the response values from the PUF generator 6. The other components of the chip 50 are also security sealed (e.g., including the data modules 14, 16, the internal input/challenge generator 4 and the key derivation module 18) to prevent tampering in an effort to determine secret information or keys associated with the chip 50.

The sealed security chip 50 is installed within an integrated circuit (IC) board along with the other components of the main portion 60 at 140, where the PCB can be integrated within a device (such as the device of FIG. 2). This processing step is typically performed by a PCB manufacturer, which is typically a different vendor than the security chip manufacturer.

After assembly, the PCB is provided to the product designer who installs software for the device at 150. The installed software includes the control process logic instructions 66 for use by the host processor 62, as well as control process logic instructions 56 for use by the security processor 52, including instructions for operation of the cryptographic module 2 and the encryption/decryption module 58 (which includes one or more encryption/decryption algorithms that are implemented for stored data based upon device specific keying material provided by the cryptographic module 2). In addition, the product designer installs data within memory 54 including device secret information (e.g., information that is already encrypted or is to be encrypted by the encryption/decryption module prior to storing within memory 54) associated with the device, device specific information for the device specific data module 14 and/or any other additional information to be provided within data module 16 (e.g., randomly generated data) for use as input data for the key derivation module 18.

Since the device specific key is generated based upon a combination of PUF output/response values, device specific data and/or additional (e.g., randomly generated) data, it is extremely difficult for any intermediate vendor in the production chain to reverse engineer device specific key information prior to software installation and storing of secret/confidential information within the security chip 50 by the product designer (i.e., the last entity involved in the production process). For example, the device specific and/or other information to be used as part of the data for generating device specific keying material, which is provided by the product designer after installation and security sealing of the security chip 50 and also after the PCB has been constructed, is not readily accessible by the chip manufacturer. Thus, while it may be possible for the chip manufacturer to determine PUF response values and corresponding ECC values based upon specific input/challenge values, the chip manufacturer cannot determine device specific key information based solely upon known PUF response values and ECC data.

Further, since the board manufacturer receives the chip 50 in a security sealed state, the PUF values output by the PUF generator remain internal within the chip 50 and are thus not accessible (since they are not output from the chip 50). The board manufacturer also has no way to determine on its own the ECC values corresponding with the specific PUF generator 6 integrated with the chip 50. If the board manufacturer (or any other third party) attempted to physically probe the chip 50, this would likely result in a structural modification to the PUF generator 6 which would in turn alter the output/response values generated by the PUF generator 6, thus fouling any device specific keying material that is generated by the cryptographic module 2 as a result of the altered PUF response values.

Figure 4:
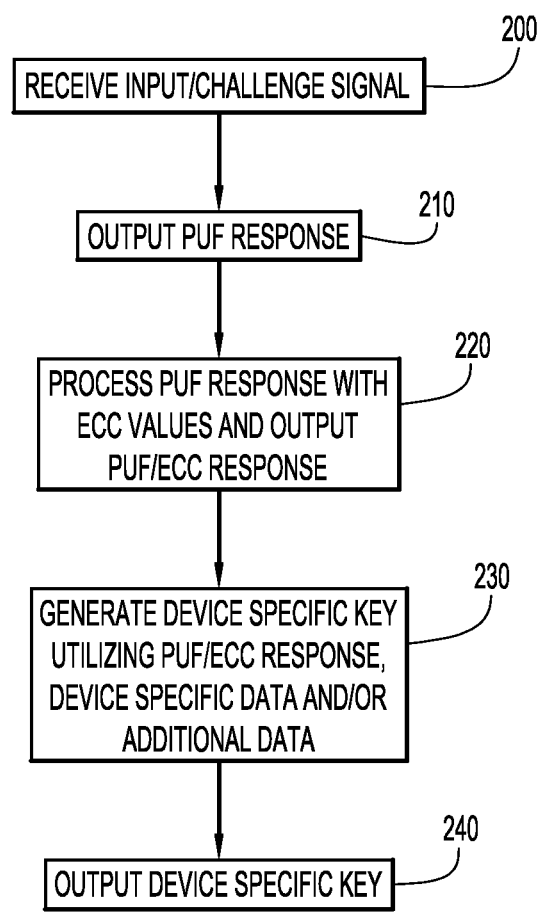
FIG. 4 is a flow chart that depicts an example method of operation of the device of FIG. 1.

Operation of the device, including operation of the security chip 50 and its components, is now described with reference to the flow chart of FIG. 4. At 200, the PUF generator 6 receives an input or challenge (e.g., in the form of an input signal or by resetting of the PUF due to a power cycle). An input/challenge signal can be provided either externally (e.g., by another component, which can be integrated within the same device as the PCB containing the security chip 50 and main portion 60 or, alternatively, in another, separate device) or internally by the internal input/challenge generator 4. In the event a separate device is providing the challenge/input signal, the signal can be received, e.g., via the I/O module 68 of the main portion 60 of the PCB, where the input/challenge data is directed by the host processor 62 to the PUF generator 6 within the security chip 50. In scenarios in which the challenge/input signal is provided internally within the chip 50 by the generator 4, the internal input signal can be generated based upon some other signal provided, e.g., by the processor 62, the co-processor 52 and/or an external input signal from another device. The input signal that is used to generate a PUF response by the PUF generator 6 could be, for example, a request for authentication or identification of a component (which may be a part of or external or peripheral to the device in which the PCB is implemented), a request for access to sensitive information (either internal or external to the device), or any other request to a restricted access in which the security chip 50 is configured to generate the access key. The input signal is provided to the PUF generator 6, which outputs a response signal that is specific to the input signal at 210. Alternatively, for certain PUF structures, such as an SRAM PUF structure, the challenge provided to the PUF structure can simply be a power cycle or resetting of the PUF structure (i.e., no input challenge need be provided to generate the output or response from the PUF structure, the power cycling results in generation of the response from the PUF structure in this scenario).

At 220, the ECC module 10 receives the output signal from the PUF generator 6 and adjusts/corrects the signal as necessary based upon the ECC values in the ECC table stored within the ECC module. At 230, the PUF response signal, which has been processed by the ECC module 10, is input to the key derivation module 18 along with device specific data from module 14 and, optionally, additional data from module 16. The key derivation module 18 outputs device specific keying material based upon the PUF response, device specific data and/or additional (e.g., randomly generated) data.

The device specific keying material is provided to the encryption/decryption module 58, which utilizes one or more cryptographic algorithms to encrypt or decrypt data that is stored within memory 54 or, alternatively, provided by the host processor 62 of the main portion 60 to the security chip 50. If a correct input/challenge was provided to the PUF generator 6 at 200, a correct or valid device specific key will have been generated by the key derivation module 18 for use in a corresponding cryptographic algorithm utilized by the encryption/decryption module 58 to encrypt or decrypt the data. However, if the input/challenge signal was improper, the output from the module 18 will not provide a valid key for the cryptographic algorithm. Depending upon a particular scenario, an invalid key generated due to an improper input/challenge signal may result, e.g., in an authentication failure for a component providing the input/challenge signal or a failure to access confidential/secret information (due to a failure to successfully decrypt encrypted data due to invalid specific device keying material provided to the encryption/decryption module 58).

The security chip with PUF generator, cryptographic module and encryption/decryption module can be used for a number of applications, including the protection of confidential or secret information (e.g., information that is stored within the memory of the security chip and is accessible only upon generation of a valid input key), authentication of a device or component, encryption of information, etc.

Thus, the methods, security chip and devices incorporating a security chip as described herein facilitate the generation of a useful device specific key that combines PUF output data with device specific data and/or other data as input to yield an output key that is reliable and secure. Combining a PUF output with device specific data minimizes the use of PUF information that might be known or discovered by the chip manufacturer and further extends the keying material to much greater bit sizes in comparison to the sole use of PUF output values as the keying material. Further, the chip design facilitates the derivation of multiple different device specific keys with relative ease for a variety of different applications or scenarios in which there may be multiple devices or components requiring authentication or protection of secret information.

The above description is intended by way of example only.

What is claimed is:

1. A method comprising:
   providing a challenge to a physically unclonable function (PUF) structure integrated within an electronic device, wherein the PUF structure outputs a specific response that is based upon the challenge;
   providing a response from the PUF structure that is based upon the challenge to a key derivation module integrated within the electronic device; and
   generating a device specific key by the key derivation module using a cryptographic key generation algorithm, wherein the device specific key is generated based upon a combination of input data comprising the PUF response and other data stored in a secure location of the electronic device.

2. The method of claim 1, wherein the PUF structure comprises an SRAM structure.

3. The method of claim 1, wherein the PUF structure outputs a set of specific responses that correspond with a set of specific challenges input to the PUF structure.

4. The method of claim 1, further comprising:
modifying the PUF response based upon operating conditions of the electronic device utilizing error correction codes stored within an error correction code module; and
providing the modified PUF response to the key derivation module.

5. The method of claim 1, wherein the other data comprises data that is specific to the electronic device.

6. The method of claim 5, wherein the other data further comprises at least one serial number associated with a component of the electronic device or a MAC address of the electronic device.

7. The method of claim 5, wherein the other data further comprises randomly generated data.

8. The method of claim 1, further comprising:
sealing the PUF structure, a memory that stores the other data and the key derivation module within a package such that all PUF responses generated by the PUF structure and all outputs by the key derivation module are maintained within the package and the other data stored by the memory is inaccessible from outside the package.

9. The method of claim 8, further comprising:
providing the other data for storage within the memory after sealing of the PUF structure, the memory and the key derivation module within the package.

10. The method of claim 8, wherein opening of the package to obtain access to PUF outputs by the PUF structure alters a configuration of the PUF structure such that the PUF structure outputs a response to a specific challenge that is different from a response to the same specific challenge prior to alteration of the PUF structure.

11. The method of claim 1, further comprising:
providing the device specific key to an encryption/decryption module that utilizes the device specific key to encrypt or decrypt information stored by the device.

12. The method of claim 8, further comprising:
providing a processor that controls operations of the PUF structure and key derivation module, wherein the processor is sealed within the package.

13. The method of claim 12, wherein the package comprises a security chip, and further comprising:
integrating the security chip with a printed circuit board, the printed circuit board comprising a host processor that controls operations of components integrated with the circuit board.

14. The method of claim 1, further comprising:
generating a plurality of device specific keys by the key derivation module using the cryptographic key generation algorithm, wherein each device specific key is generated based upon a combination of input data comprising a specific PUF response and corresponding securely stored data that corresponds with the specific PUF response, each device specific key being associated with a different application in relation to other device specific keys.

15. A device comprising a sealed security chip, the sealed security chip comprising:
a physically unclonable function (PUF) structure, wherein the PUF structure outputs a specific response that is based upon a specific challenge;
memory to store data associated with the security chip;
a key derivation module that generates a device specific key using a cryptographic key generation algorithm, wherein the device specific key is generated based upon a combination of input data comprising the PUF response and other data stored within the memory; and
a processor to control operations of the PUF structure and the key derivation module.

16. The device of claim 15, wherein the PUF structure comprises a SRAM structure.

17. The device of claim 15, wherein the PUF structure outputs a set of specific responses that correspond with a set of specific challenges input to the PUF structure.

18. The device of claim 15, wherein the security chip further comprises:
an error correction code (ECC) module that modifies the PUF response prior to the PUF response being combined with other data for input to the key derivation module.

19. The device of claim 15, wherein the memory stores the other data, and the other data comprises data that is specific to the device.

20. The device of claim 19, wherein the other data comprises at least one serial number associated with a component of the device or a MAC address of the device.

21. The device of claim 15, further comprising:
an encryption/decryption module that utilizes the device specific key to encrypt or decrypt information stored by the memory.

22. The device of claim 15, wherein the sealed security chip is configured such that all output responses by the PUF structure, all output responses by the key derivation module and all data stored by the memory are secured within and inaccessible outside of the security chip.

23. The device of claim 21, wherein the device further comprises:
a printed circuit board with which the security chip is integrated; and
a host processor that controls operations of other components integrated with the circuit board as well as the processor of the security chip.

24. One or more computer readable storage media devices encoded with software comprising computer executable instructions and when the software is executed operable to:
generate a device specific key based upon a combination of input data, the combination of input data comprising a response output from a physically unclonable function (PUF) structure and other data;
wherein the PUF structure outputs a specific response that is based upon a specific challenge provided to the PUF structure, and the other data comprises data that is specific to an electronic device in which the computer readable storage media are integrated.

25. The one or more computer readable storage media devices of claim 24, wherein the other data comprises at least one serial number associated with a component of the electronic device or a MAC address of the electronic device.

26. The one or more computer readable storage media devices of claim 24, wherein the other data further comprises randomly generated data.

* * * * *